(12) United States Patent
Arai et al.

(10) Patent No.: US 6,302,792 B1
(45) Date of Patent: Oct. 16, 2001

(54) METHOD OF SETTING LEVEL PARAMETERS OF ENEMY CHARACTERS OF A COMPUTER GAME AND DEVICE THEREFOR

(75) Inventors: Koji Arai; Hideki Sahashi, both of Sapporo (JP)

(73) Assignee: Hudson Soft Co., Ltd., Sapporo (JP)

( * ) Notice: Subject to any disclaimer, the term of this patent is extended or adjusted under 35 U.S.C. 154(b) by 0 days.

(21) Appl. No.: 09/331,165
(22) PCT Filed: Oct. 19, 1998
(86) PCT No.: PCT/JP98/04711
  § 371 Date: Aug. 18, 1999
  § 102(e) Date: Aug. 18, 1999
(87) PCT Pub. No.: WO99/20362
  PCT Pub. Date: Apr. 29, 1999

(30) Foreign Application Priority Data
Oct. 20, 1997 (JP) .................................... 9-304997

(51) Int. Cl.[7] .................................... A63F 13/00
(52) U.S. Cl. .................. 463/23; 463/8; 463/43; 273/148 B
(58) Field of Search .................. 463/43, 44, 45, 463/30, 31, 32, 34, 23, 7, 8, 9, 40–42; 700/90, 91, 92; 273/440, 441, 442, 443, 445, 148 B

(56) References Cited

U.S. PATENT DOCUMENTS

| | | | |
|---|---|---|---|
| 5,377,100 | * 12/1994 | Pope et al. | 700/91 |
| 5,390,937 | * 2/1995 | Sakaguchi et al. | 463/44 |
| 5,649,861 | * 7/1997 | Okano et al. | 463/30 |
| 5,649,862 | * 7/1997 | Sakaguchi et al. | 463/44 |
| 5,807,174 | * 9/1998 | Fukuhara et al. | 463/31 |

OTHER PUBLICATIONS

Robert Brady "DOOM" Totally Unauthorized Tips and Secrets Brady Games pp. 1–4 and 22–57, Dec. 1994.*

* cited by examiner

Primary Examiner—Michael O'Neill
(74) Attorney, Agent, or Firm—Oblon, Spivak, McClelland, Maier & Neustadt, P.C.

(57) ABSTRACT

In a computer role-playing game, the level of an enemy character is set to a proper value in various story developments. When a player character first encounters an enemy character, the level of the enemy character is calculated on the basis of the current level of the player character, and the thus-set level of the enemy character is maintained during the game.

9 Claims, 2 Drawing Sheets

METHOD OF SETTING LEVEL PARAMETERS OF ENEMY CHARACTERS OF A COMPUTER GAME AND DEVICE THEREFOR

TECHNICAL FIELD

The present invention relates to a method of setting a strength level (hereinafter simply referred to as a "level") and parameters of an enemy character in a computer game in which a player character—which acts in accordance with operations performed by a player—fights with one or a plurality of enemy characters appearing in the game, and more particularly to setting of a level and parameters in a role-playing game.

BACKGROUND ART

In a certain type of computer games such as adventure games and role-playing games, play progresses in accordance with a story, which in turn follows a scenario. The scenario is composed of a plurality of sub-scenarios. In a typical adventure game, the story progresses in accordance with the scenario. For example, when sub-scenarios 1, 2, 3, 4, . . . N are provided, the game proceeds In accordance with the sequence of the sub-scenarios 1, 2, 3, 4, . . . N. In such a game, a player must sequentially clear the stages corresponding to the sub-scenarios in order to proceed to the next stage. Such a game is called a single-scenario-type game.

Meanwhile, a game whose story proceeds according to one of a plurality of possible scenarios is called a multi-scenario-type game. When sub-scenarios 1, 2, 3, 4, . . . N are provided, the story can proceed according to any of a plurality of possible scenarios, as shown in FIG. 1. In FIG. 1, the sub-scenarios enclosed by "{}" are followed in one of a plurality of possible sequences. That is, the story sometimes proceeds in the following sequence:

sub-scenario 1→sub-scenario 2→sub-scenario 3 and sometimes proceeds in the following sequence:

sub-scenario 3→sub-scenario 2→sub-scenario 1.

As compared with the single-scenario-type game, the multi-scenario-type game allows greater flexibility in terms of story development.

Battle, together with story development, lends interest to the game. There are provided scenes in which a player character encounters and fights enemy characters in the course of an adventure. In such a game, a parameter representing the strength of the player character or the strength of an enemy character is called a "level."

The level of the player character is increased when the player character defeats one or a plurality of enemy characters. The game can be designed such that the level of the player character increases in different manners depending on the level of the defeated enemy character(s). For example, the game may be designed such that in the case of monster A, the level of the player character is increased by one unit when the player character defeats ten monsters, and in the case of monster B, the level of the player character is increased by one unit when the player character defeats three monsters. If the level of the player character is increased while the level of the enemy character(s) is maintained constant, the difficulty of the game decreases with the progress of the story. In order to solve such a problem, the level of a newly appearing enemy character is set in accordance with the current level of the player character. In the single-scenario-type game, since the story develops in ascending sequence of scenario number, the level of the enemy character(s) can be easily set for each sub-scenario.

For examples, since a player must clear a stage corresponding to sub-scenario n in order to move to the next stage corresponding to sub-scenario n+1, the level of the player is expected to have increased to some degree when the player has moved to the next stage. Therefore, a desirable result is obtained if the game is designed such that the level of the enemy character(s) is set in accordance with the increased level of the player.

However, in a multi-scenario-type game, since the sequence of the sub-scenarios is not constant, and the level of a player at the beginning of a sub-scenario cannot be predicted, the level of the enemy character(s) cannot be set in accordance with the level of the player. Therefore, in the conventional multi-scenario-type game, the level of the enemy character(s) is set according to one of the following methods.

Method 1: The level of the enemy character(s) is set in accordance with the ascending order of scenario numbers.

Method 2: A relative level for each enemy character corresponding to the level of the player character is prepared, and for each battle (encounter between the player character and an enemy character) the level of an enemy character is set in relation to the level of the player character.

In Method 1, the level of the enemy character is set in the same manner as in the single-scenario-type game. In such a setting method, no problem arises when the story progresses in the sequence of sub-scenarios 1→2→3→. . . However, when the story progresses in the sequence of sub-scenarios 3→2→1→. . . , the player must fight with a far stronger enemy character from the beginning, making the game difficult for the player from the beginning. Accordingly, the player can play the game with interest only when the story proceeds in the sequence of sub-scenarios 1→2→3→. . . thus making the story the same as in the single-scenario-type game.

Method 2 seems good, since the level of each enemy character is set in accordance with the current level of the player character. For example, when the level of the player character is 5 and the relative level of an enemy character is +1, the level of the enemy character, with which the player character fights, becomes 6 (=5+1), so that the player must always fight an enemy whose level is one unit higher. The problem presented by this method is that the player loses the fulfillment that would otherwise result from the increase in the level of the player character.

That is, when the level of the player character is increased the level of the enemy character(s) increases accordingly, with the result that the enemy character is always stronger than the player character. Therefore, the player is forced to undergo severe battles, and feels no improvement in his/her skill, with the result that the player loses interest in the game.

As described above, the conventional method for setting the level of enemy characters in multi-scenario-type game has drawbacks in that the level of a player character is not reflected in the levels of enemy characters, and the player must always fight enemy characters whose levels are higher than that of the player character. Therefore, the player's skill cannot be reflected in the game, and therefore the player cannot experience fulfillment and satisfaction, so that the player eventually loses interest in the game itself.

The ideal story development in a computer game is such that as the level of a player character increases the level of enemy characters also increases, and such that an increase in the level of the player is directly reflected in the game. For example, there develops a situation in which a player first fights a relatively weak enemy character, and when the player defeats the enemy character, the player feels that the player character has became stronger. After the story develops in this manner for a certain period of time, the player seeks a stronger enemy character.

An object of the present invention is to provide a method of setting the level of an enemy character in such a way that the story develops in the above-described ideal manner In a multi-scenario-type computer game.

DISCLOSURE OF THE INVENTION

The present invention provides a method of setting the level of an enemy character in a computer game in which a player character—which acts in accordance with operations of a player—fights with one or a plurality of enemy characters who appear in the game, wherein when the player character first encounters an enemy character, the level of the enemy character is calculated on the basis of the current level of the player character, and the thus-set level of the enemy is maintained during the game.

In the present invention, the difference, upon first encounter, between the level of an enemy character and the level of the player character is called a "basic relative level," and the level of the enemy is obtained as follows:

(Level of an enemy character)=(Level of the player character)+
(Basic relative level)

However, when necessary, the calculated level of the enemy character is restricted to a predetermined upper or lower limit.

Specifically, the level of an enemy character is represented by use of a set of parameters respectively representing physical strength, offensive skill, defensive skill, quickness, etc. The enemy character's fixed level or set of parameters is generally maintained constant. A separate set of parameters is preferably prepared for each of a plurality of types of enemy characters. FIG. 2 shows the relationship between the level of an enemy character and the level of the player character. In FIG. 2, $L_p$ represents the level of the player character, $L_{Ek}$ represents the level of an enemy character k, and $P_k$ represents a point where the player character first encounters the enemy character. Although the level of the player character does not increase at a constant rate (i.e., along a straight line) as shown in FIG. 2, the strength of the player character generally increases as the story progresses.

In the multi-scenario-type game, the time when the player character encounters an enemy character changes depending on the scenario. In the present invention, the level of an enemy character is set on the basis of the level of the player character upon first encounter. Therefore, different levels are set for different enemy characters of the same type, depending on the time of the first encounter, which varies depending on the scenario.

The set of parameters specifically representing the strength of an enemy is calculated on the basis of the level. Each of the parameters is determined through calculation by use of a function whose argument is the level, or through selection of values from a table. When the game is designed to set different values for the parameters depending on the level, an enemy character can have completely different characteristics depending on the scenario.

BEST MODE FOR CARRYING OUT THE INVENTION

Figure 3:
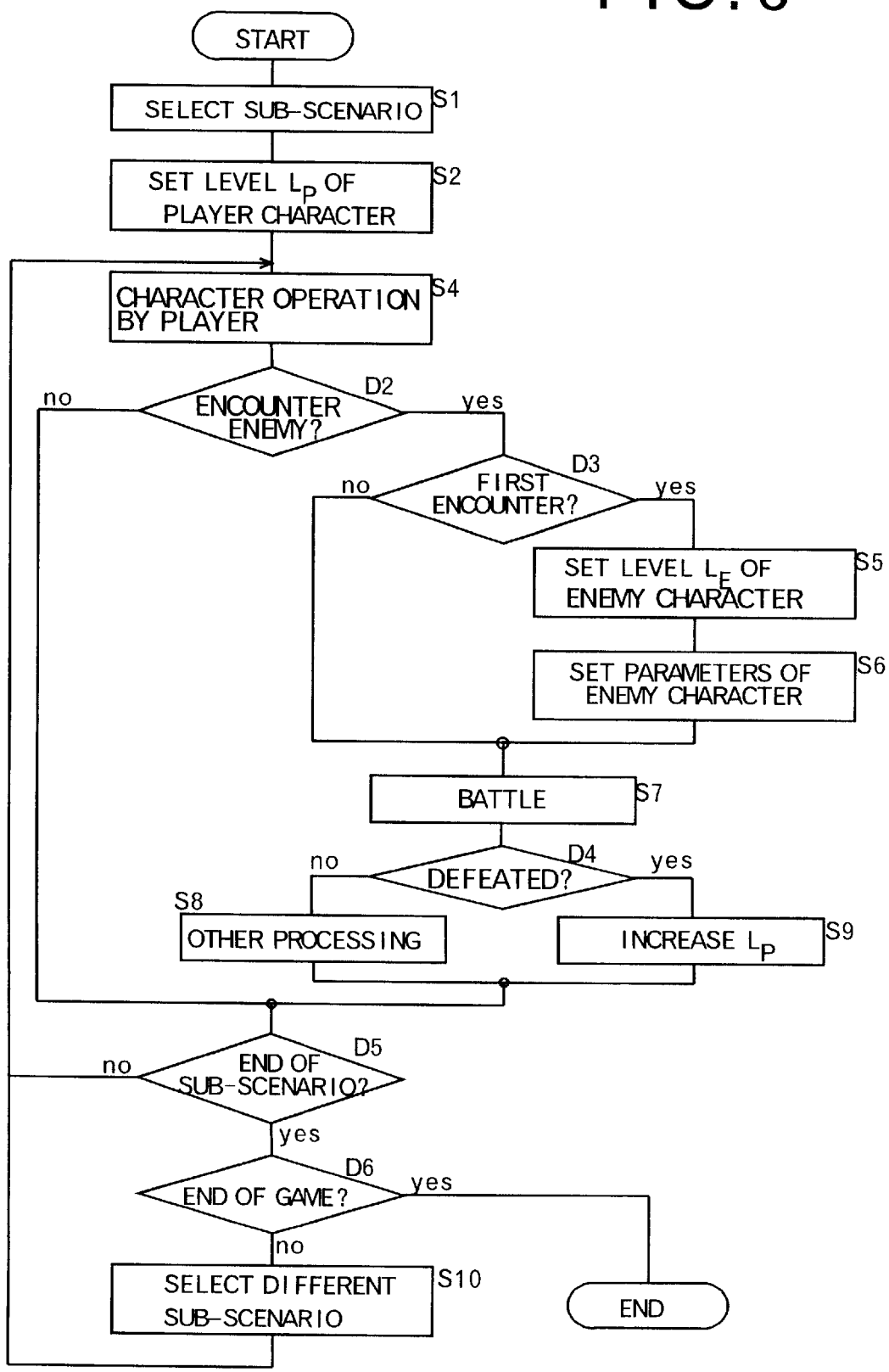
FIG. 3 is a flowchart according to an embodiment of the present invention.

FIG. 3 is a flowchart according to an embodiment of the present invention. In the present invention, when the player character first encounters an enemy character, the level of the enemy character is set (judgment D3 and processing step S5). Subsequently, on the basis of the thus-determined level, a set of parameters representing the strength of the enemy character is calculated (judgment D3 and processing step S6).

Figure 1:
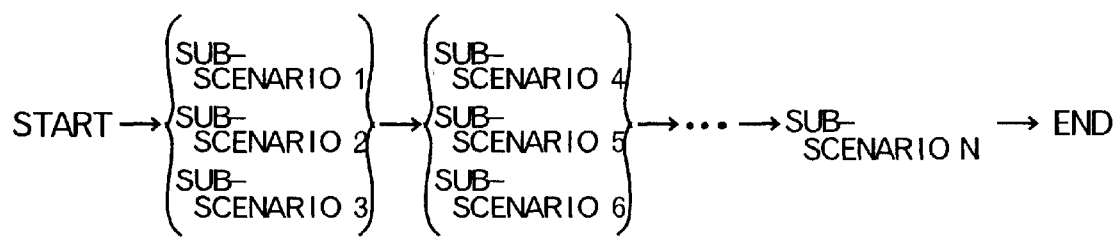
FIG. 1 is a diagram showing an example progression of a conventional multi-scenario-type game.
Figure 2:
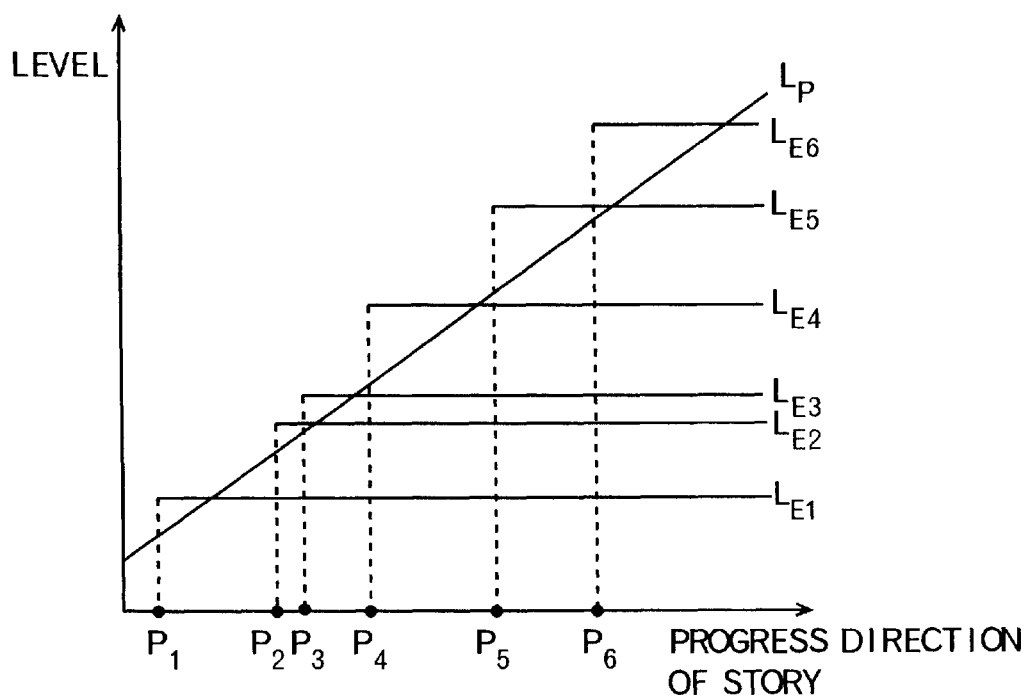
FIG. 2 is a diagram showing the relationship between the level of the player character and the levels of enemy characters.

That is, the set of parameters representing the strength of the enemy character is calculated upon first encounter, and is maintained constant thereafter. The set of parameters representing the strength of the enemy character is determined on the basis of the level $L_E$. However, since the level $L_E$ and the parameters are fixed for each type of enemy character, the processing must be performed such that in first encounter judgment D3 a judgment is made as to whether the encounter with enemy character k is the first, and the level set by the processing step S5 must be represented as $L_{EK}$. In FIG. 2, the type of enemy is omitted for simplification.

In the present invention, the level of an enemy character is set on the basis of the level $L_P$ of the player character upon first encounter. That is, $$L_{EK}=f_k(L_P).$$

Here, $f_k$ is an appropriate function for the enemy character k which depends on $L_P$. For example, the function $f_k(L_P)$ can be expressed as follows through use of a basic relative level $L_{ER}$ (where $L_{ER}$ is a constant):

$$f_k(L_P)=L_P+L_{ER}.$$

In this case, when the basic relative level $L_{ER}$ is 2 and the level $L_P$ of the player character upon first encounter with the enemy is 10, the level of the enemy character becomes 12. That is, the level of the enemy character changes depending on the manner in which sub-scenarios are selected. This will be better understood from the following example.

A story is assumed to develop in accordance with a scenario composed of sub-scenarios A, B, C, and D, whose sequence can be freely selected, and the basic relative level of the enemy character X is +5. It is also assumed that player 1 has followed the sub-scenarios in the sequence:

A→B→C→D, and player 2 has followed the sub-scenarios in the sequence:

D→C→B→A.

Since player 1 selected the sub-scenario A at an early stage, the level of the player 1 appears to be low. If the level of a player character for the player 1 is 5 at the time when the sub-scenario A is selected (when the player character first encounters the enemy character X), the level of the enemy character X is 10. Meanwhile, player 2 has reached the sub-scenario A after clearing the stages corresponding to the sub-scenarios D, C, and B, during which time the level of player 2 has increased.

Assuming that the level of a player character for player 2 is 15 upon first encounter with the enemy character X at a stage corresponding to the sub-scenario A, the level of the enemy character X becomes 20. That is, a weak enemy character X appears for the player character corresponding to player 1, while a strong enemy character X appears for the player character corresponding to player 2. As described above, the same enemy character may have different levels depending on the player.

In relation to setting the level of the enemy character, upper and lower limits are preferably provided in order to avoid setting of an extreme level. That is, when the upper limit is represented by $L_{Emax}$ and the lower limit is represented by $L_{Emin}$, the level $L_E$ of the enemy character is calculated as follows:

when $L_E > L_{Emax}, L_E = L_{Emax}$ when $L_E < L_{Emin}, L_E = L_{Emin}$

Similarly, upper and lower limits are set for the level of the player character. Thus, it becomes possible to prevent a player's intentional operation of needlessly increasing the level of the player character through continuous fighting weak enemies, as well as a player's intentional operation of continuously causing the game program to create weak enemies by running about trying to escape an encountered enemy.

The factors that actually represent the strength of an enemy character include physical strength, offensive skill, defensive skill, quickness, etc. These factors will be called parameters. The parameters are calculated on the basis of the level of the enemy character. Since the values of the parameters are obtained by processing step S6 in the flowchart of FIG. 3 on the basis of the level of the enemy character, the value $Q_{Em}$ of parameter m is calculated as follows:

$Q_{Em} = g(L_E)$.

Although g represents a function, in the actual program, $Q_{Em}$ may be obtained, not through use of a simple calculation formula, but through combined use of a table and the function. Once the $Q_{Em}$ and $L_E$ are set, these values are maintained constant during the game. Especially, by changing set values of $Q_{Em}$, the characteristics of the enemy character can be set to totally different characteristics in accordance with the selection sequence of the sub-scenarios. Therefore, each player can be provided with a completely different game.

The battle in processing step S7 corresponds to a fight with an enemy character. In this case, the player can select an option of running away without fighting. According to a conventional game, the action of running away can be used as a strategic action in which a player character is caused to encounter enemy characters during a period in which the level of the player character is still low, to thereby set the levels of all enemy characters to low values, and subsequently the level of the player character is increased, with the result that the player character always fights weak enemies. If the above-described method is used, only weak enemies can be created. In order to solve such a problem, a lower limit is set, and the level of the enemy character is prevented from becoming lower than the lower limit.

Processing S9 increases the level of the player character when the player character defeats an enemy character during a battle. In the flowchart, a simple judgment is made as to whether the player character has defeated the enemy (judgment D4). However, the judgment D4 and the processing step S9 are performed differently depending on the type of the enemy character. For example, the level of the player character is increased by one unit when the player character defeats 10 enemy characters k, and is increased by two units when the player character defeats 5 enemy characters s. Further, when the player character fails to defeat the enemy character (e.g., when the player character runs away or is damaged), the processing S8 step updates the parameters (including the level) of the player character. In general, when the player character runs away without taking any action, the parameters of the player do not change.

As described above, the story of the game is developed sub-scenario by sub-scenario; the level of the enemy character changes depending on the sequence of selected sub-scenarios; and the parameters determined according to the level change accordingly. Therefore, each player can enjoy a game which is uniquely modified for the player.

As an embodiment of the present invention, an example of a method of setting the level of an enemy character and various parameters will be described. When the lower limit for level LV is 1 and the upper limit for the level LV is 100, a parameter K for physical strength is introduced in accordance with the following equations:

$K = (4^a) + 30$ $a = INT(LV/15) + 2$

The K corresponding to each level is represented by the following table.

| Level of enemy character | Constant (K) |
| --- | --- |
| 1 ≤ LV < 15 | 46 |
| 15 ≤ LV < 30 | 94 |
| 30 ≤ LV < 45 | 286 |
| 45 ≤ LV < 60 | 1054 |
| 60 ≤ LV < 75 | 4126 |
| 75 ≤ LV < 90 | 16414 |
| 90 ≤ LV < 100 | 65566 |

When the lower limit for level LV is 1 and the upper limit for the level LV is 100, a parameter K for each of offensive skill, defensive skill, and quickness is introduced in accordance with the following equations:

$K = a \times 10 + 50$ $a = INT(LV/20)$

Parameter K corresponding to each level is represented by the following table.

| Level of enemy character | Constant (K) |
| --- | --- |
| 1 ≤ LV < 20 | 50 |
| 20 ≤ LV < 40 | 60 |
| 40 ≤ LV < 60 | 70 |
| 60 ≤ LV < 80 | 80 |
| 80 ≤ LV < 100 | 90 |

These parameters are stored and used when the player character encounters an enemy character again.

In the present invention, the parameters of an enemy character are set upon first encounter. Therefore, even if the player first feels that an enemy character is strong, the player feels that the enemy character is weak when the level of the player character has increased with progress of the story, or when the player character again fights a previously encountered enemy character, so that the player can feel that his/her skill has improved. At the same time, the player is satisfied with his/her skill.

In the method of the present invention, the level of an enemy character changes depending on the sequence of selected sub-scenarios, and as described in the embodiment, the same enemy character can be caused to appear to have completely different characteristics, depending on the manner of setting the parameters. Therefore, even if an enemy character X is a very weak monster for a player A, to a player B the enemy may appear to be nimble and to have great offensive skill. Also, a player C may feel that the same enemy character was difficult to defeat although the enemy character is dull and has weak offensive skill. The difference in impressions among the players occurs because, depending on the time when the player character encounters the enemy character, the level of the player character changes and the parameters of the enemy character are set to completely different values. As described above, each player can create his/her own unique game.

INDUSTRIAL APPLICABILITY

The method according to the present invention is particularly effective in computer games, such as role-playing games and adventure games, in which a player character fights with enemy characters and the story develops in accordance with one of a plurality of scenarios, each scenario comprising a series of sub-scenarios. For example, when a player resets a computer to re-start the game and follows a different scenario, the player can perceive the game to be much different from the previously played game. An especially great effect is attained in role-playing games. In a conventional game, once the game has been finished, the player can read the story development in a second or subsequent play, with the result that the player loses interest in the game. By contrast, in the game created in accordance with the present invention, since the characteristics of each enemy character change in accordance with the manner in which sub-scenarios are selected, the player can enjoy the same game in several different ways at different times. Further, it is possible to prevent the case where the intended story is lost due to an intentional operation that the author of the game did not intend for the player to pursue.

What is claimed is:

1. A method of executing a computer game including a player character which acts in accordance with operations of a player and fights with one or a plurality of enemy characters who appear in the game, said method comprising:
   calculating a level of an enemy character based on a current level of the player character when the player character first encounters the enemy character;
   setting the level of the enemy character in accordance with a result of the calculating step; and
   maintaining the set level of the enemy character during the computer game.

2. A computer game device including a player character which acts in accordance with operations of a player and fights with one or a plurality of enemy characters who appear in the game, said device comprising:
   means for calculating a level of an enemy character based on a current level of the player character when the player character first encounters the enemy character;
   means for setting the level of the enemy character in accordance with a result of the calculating means; and
   means for maintaining the set level of the enemy character during the game.

3. A computer program product for executing a computer game including a player character which acts in accordance with operations of a player and fights with one or a plurality of enemy characters who appear in the game, said computer program product comprising:
   a first computer code configured to calculate a level of the enemy character based on a current level of the player character when the player character first encounters the enemy character; and
   a second computer code configured to set the level of the enemy character in accordance with a result of the first computer code; and
   a third computer code configured to maintain the set level of the enemy character during the game.

4. A method of executing a computer game including a player character which acts in accordance with operations of a player and fights with one or a plurality of enemy characters who appear in the game, said method comprising:
   calculating a level of an enemy character within a predetermined range and based on a current level of the player character when the player character first encounters the enemy character;
   setting the level of the enemy character in accordance with a result of the calculating step; and
   maintaining the set level of the enemy character during the computer game.

5. A computer game device including a player character which acts in accordance with operations of a player and fights with one or a plurality of enemy characters who appear in the game, said device comprising:
   means for calculating a level of an enemy character within a predetermined range and based on a current level of the player character when the player character first encounters the enemy character;
   means for setting the level of the enemy character in accordance with a result of the calculating means; and
   means for maintaining the set level of the enemy character during the game.

6. A computer program product for executing a computer game including a player character which acts in accordance with operations of a player and fights with one or a plurality of enemy characters who appear in the game, said computer program product comprising:
   a first computer code configured to calculate a level of the enemy character within a predetermined range and based on a current level of the player character when the player character first encounters the enemy character; and
   a second computer code configured to set the level of the enemy character in accordance with a result of the first computer code; and
   a third computer code configured to maintain the set level of the enemy character during the game.

7. A method of executing a computer role-playing game including a player character which acts in accordance with operations of a player and fights with one or a plurality of enemy characters who appear in the game, said method comprising:
   calculating a level of an enemy character within a predetermined range and based on a current level of the player character when the player character first encounters the enemy character;
   setting the level of the enemy character in accordance with a result of the calculating step; and
   maintaining the set level of the enemy character during the computer game.

8. A computer role-playing game device including a player character which acts in accordance with operations of a player and fights with one or a plurality of enemy characters who appear in the game, said device comprising:

means for calculating a level of an enemy character within a predetermined range and based on a current level of the player character when the player character first encounters the enemy character;

means for setting the level of the enemy character in accordance with a result of the calculating means; and means for maintaining the set level of the enemy character during the game.

9. A computer program product for executing a computer role-playing game including a player character which acts in accordance with operations of a player and fights with one or a plurality of enemy characters who appear in the game, said computer program product comprising:

a first computer code configured to calculate a level of the enemy character within a predetermined range and based on a current level of the player character when the player character first encounters the enemy character; and a second computer code configured to set the level of the enemy character in accordance with a result of the first computer code; and a third computer code configured to maintain the set level of the enemy character during the game.

\* \* \* \* \*